E. F. McLAUGHLIN.
FRUIT PACKING DEVICE.
APPLICATION FILED APR. 29, 1908.
912,874.
Patented Feb. 16, 1909.
2 SHEETS—SHEET 1.
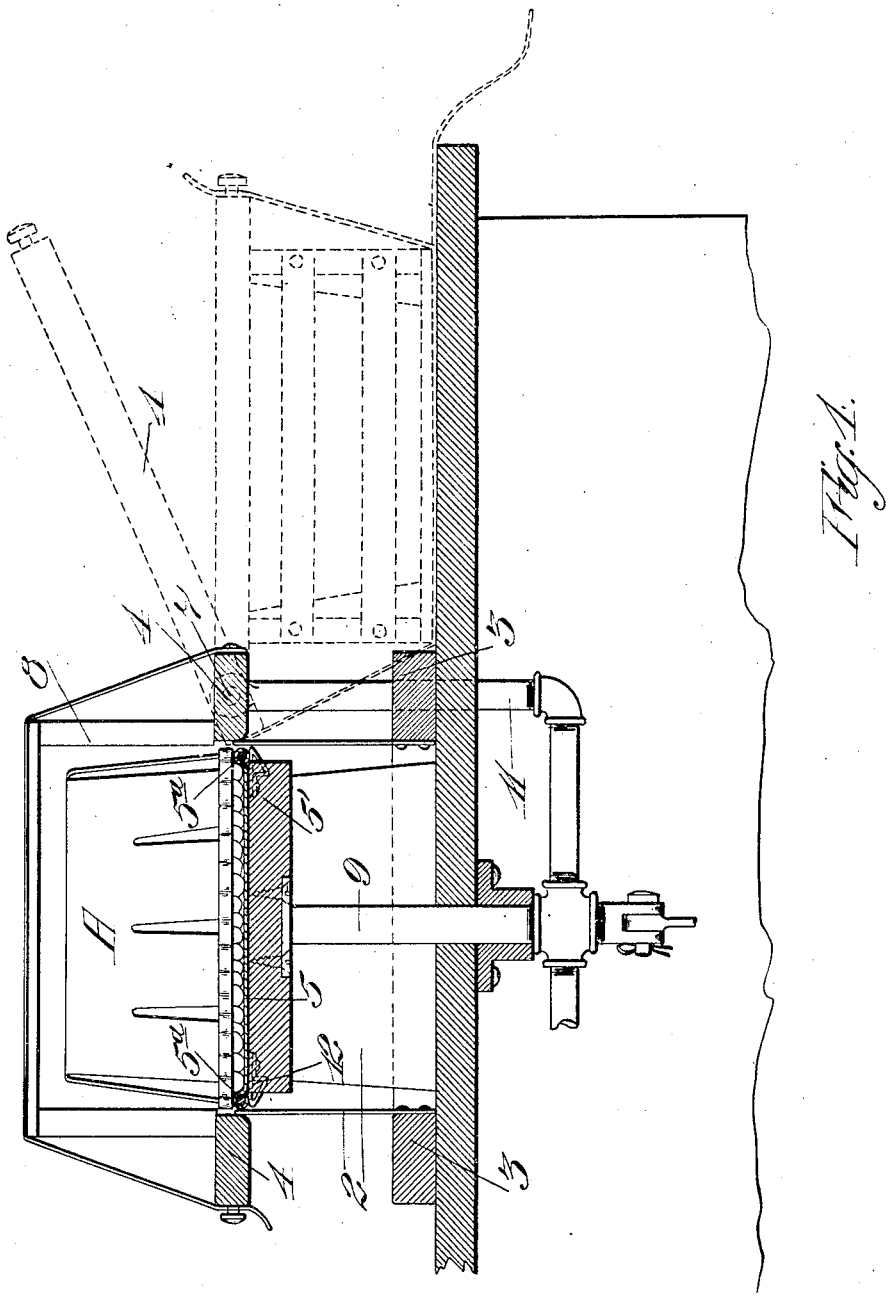

E. F. McLAUGHLIN.
FRUIT PACKING DEVICE.
APPLICATION FILED APR. 29, 1908.
912,874.
Patented Feb. 16, 1909.
2 SHEETS—SHEET 2.
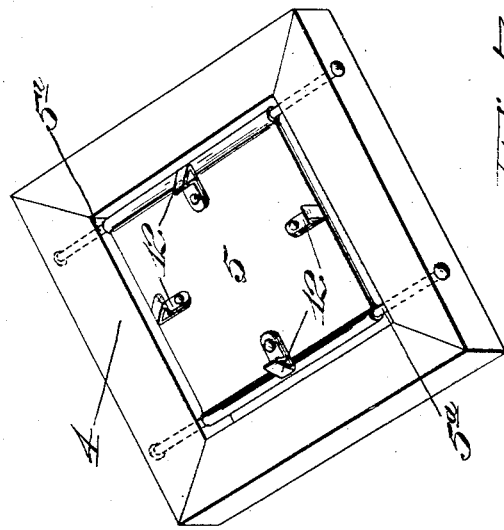
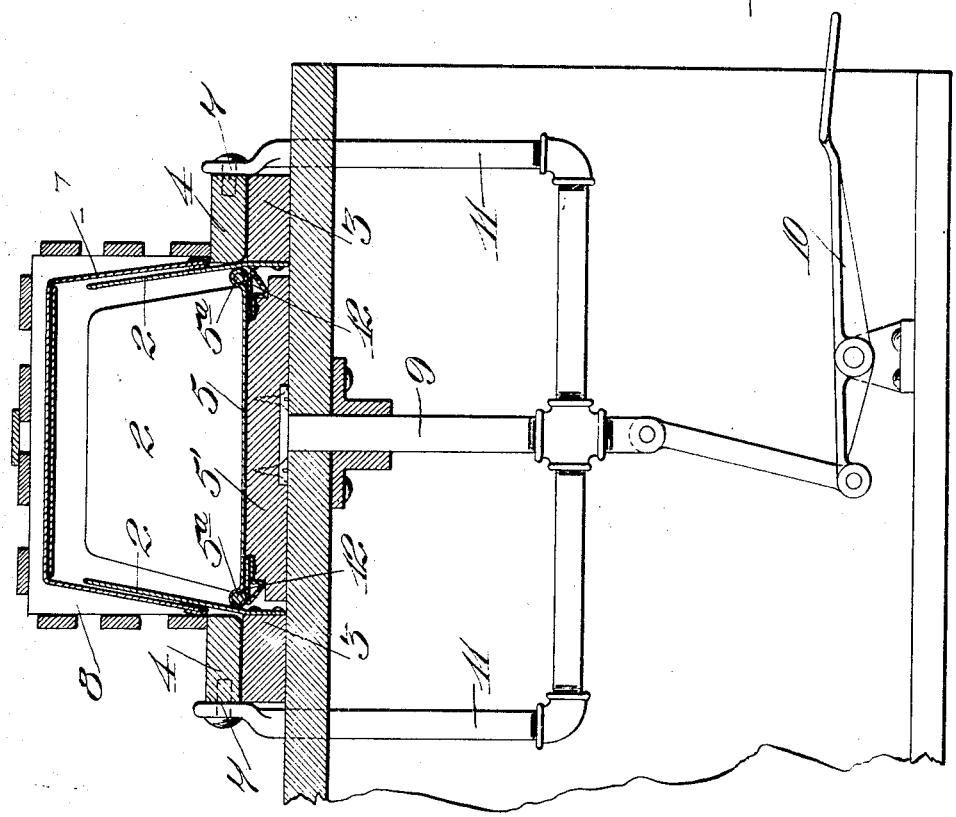
Witnesses.
J. Castberg
C. A. Renfield
Inventor.
Eugene F. McLaughlin
by Geo. H. Strong
Atty.

UNITED STATES PATENT OFFICE.

EUGENE F. McLAUGHLIN, OF SAN FRANCISCO, CALIFORNIA, ASSIGNOR OF ONE-FOURTH TO SARAH H. HOWES, OF SAN FRANCISCO, CALIFORNIA.

FRUIT-PACKING DEVICE.

No. 912,874.  Specification of Letters Patent.  Patented Feb. 16, 1909.

Application filed April 29, 1908. Serial No. 430,027.

*To all whom it may concern:*

Be it known that I, EUGENE F. McLAUGHLIN, citizen of the United States, residing in the city and county of San Francisco and State of California, have invented new and useful Improvements in Fruit-Packing Devices, of which the following is a specification.

My invention relates to an apparatus designed for packing small fruits, but more especially grapes, which are usually packed into veneer baskets, and these baskets into crates.

It consists in the combination of parts, and in details of construction which will be more fully explained by reference to the accompanying drawings, in which—

Figure 1 is a side elevation in section showing my device. Fig. 2 is a cross section of Fig. 1. Fig. 3 is a perspective view, showing the basket supporting frame and bottom.

Grapes are usually packed in veneer baskets, holding four, five or other number of pounds, and this work is done by hand, and takes considerable time and a good deal of skill to present the surface at the top of the basket in an attractive form.

It is the object of my invention to provide an apparatus by which this packing will be rapidly and skilfully done.

Baskets of the character described are made of veneers folded across each other, with slightly flaring sides, and the upper edges are held in place by strips of tin, or thin sheet metal folded and compressed upon the edges of the basket. A is such a basket, and 2 are elastic or equivalent sheet metal sides fixed to a base 3, and converging upwardly so that the basket A may be inverted over these independent convergent sides, with the bottom resting approximately upon the upper edges of these sides. Exterior to these metal sides is a rectangular frame 4 which is vertically slidable, and upon which frame the upper edge of the inverted basket rests. Within these sides is a bottom 5 which substantially fits the larger area included by the lower part or bottom of these sides. This bottom is supported on rods 5ª which extend through the openings between the corners of the side plates, and are secured to the frame 4. This bottom serves for the purpose of first packing the grapes or other fruit so as to present a nice and symmetrical appearance, and the space between the sides is filled with the fruit. The basket is then inverted over these sides and the fruit contained therein, and by suitable mechanism the movable bottom 5 is raised within the inclosing sides. The frame-work upon which the top of the basket rests is so connected as to be raised simultaneously with the bottom. Thus this bottom in rising spreads the sides apart, and at the same time the basket is simultaneously raised by means of the frame-work until it is clear of the top of these sides. The frame-work is hinged at one side, as shown at 7, and it and the basket may then be turned about the hinges until the basket is right side up, with its contents. This explains the manner of filling a single basket, but in practice these baskets are placed in exterior crates 8, to the number of four or more; therefore for practical purposes there would be four of the filling devices, with their bottoms, over which four of the baskets may be inverted at one time after each form has been filled; then a crate is placed over the baskets, and the whole apparatus being raised up, the frame upon which the baskets and crate have been inverted will be turned about its hinges so as to bring the crate and baskets in an upright position, and they are then ready for removal. Various mechanical devices may be employed for reciprocating these parts.

As shown in my present device, the movable bottom or bottoms 5 and 5′ are carried by a vertically guided reciprocating rod 9 connected by a pitman with a foot lever 10. The exterior surrounding frame is in a similar manner connected with the foot lever by arms or yokes 11, in the upper ends of which the frame is hinged as shown. Thus when the foot is placed upon the lever, the frame and the basket or baskets are raised as previously described. It will be understood that in the raising of this bottom within the sides of the packing device, these sides being convergent in their normal position, and of the same shape as the basket, will be gradually separated by the raising of this bottom, but as the basket is raised at the same time, it will leave space enough so that when the bottom has reached the top of its movement, the top of the basket will also be at that point, and being of substantially the same size as the top of the basket, there will be no strain or breakage of the basket. After the frame has been turned over about its hinges and the basket and crate discharged, the frame is again turned back into position to be again introduced between the sides. In order to insure its properly entering between these sides I have shown inclined or beveled guides 12. These guides are placed around the edges on the lower side of the bottom 5, and they first strike the upper edges of the metal sides, and thus separate them a little so as to insure the bottom again entering its place between these sides; after which by releasing the foot lever, or other actuating means, the bottom will sink to its normal position between these sides, ready to be again filled.

With an apparatus of this character I am enabled to rapidly and symmetrically pack any number of baskets that can be conveniently operated by a single device, and to place the baskets in their crates in readiness for shipment, with the least possible handling and labor.

Having thus described my invention, what I claim and desire to secure by Letters Patent is—

1. In an apparatus of the character described, a form consisting of independent upwardly projecting sides, a bottom fitting within said form adapted to receive the fruit to be packed, a vertically slidable surrounding frame upon which the receiving basket is inverted and supported to inclose the packing form, and means by which the basket and the bottom are simultaneously raised in a vertical plane.

2. In an apparatus of the character described, a device for packing fruit, said device consisting of independent upwardly projecting sides, a bottom fitting within said sides, an inclosing frame hinged at one side and adapted to receive a basket inverted to inclose the packing device, a reciprocating support to which the bottom is fixed, a support movable in unison therewith to which the surrounding frame is hinged.

3. In an apparatus of the character described, fixed upwardly projecting and convergent sides, a bottom fitting the lower and larger area between said sides and serving to receive the fruit to be packed, a frame inclosing the packing device and serving to support the edges of the basket inverted over said device, a reciprocating standard and means for moving it, to the bottom of which standard the bottom is fixed, a yoke or support movable in unison with the standard and carrying pivots to which the frame is hinged.

4. In an apparatus of the character described, independent upwardly projecting convergent sides adapted to fit the interior of an inverted basket, a bottom fitting the larger area between the lower part of said sides, an open frame inclosing said sides and adapted to support the edges of a basket inverted over the packing form, vertically reciprocable supports for the bottom of the frame, with hinge pins about which the frame is turnable after being raised, whereby the baskets are turned with the frame and placed in an upright position, and beveled guides fixed beneath the movable bottom whereby it is directed and again placed within the sides when restored thereto.

In testimony whereof I have hereunto set my hand in presence of two subscribing witnesses.

EUGENE F. McLAUGHLIN.

Witnesses:
 GEO. H. STRONG,
 B. AGNES McLAUGHLIN.